Aug. 23, 1938.  R. S. SANFORD ET AL  2,128,165
VEHICLE CONTROL MECHANISM
Filed March 11, 1936
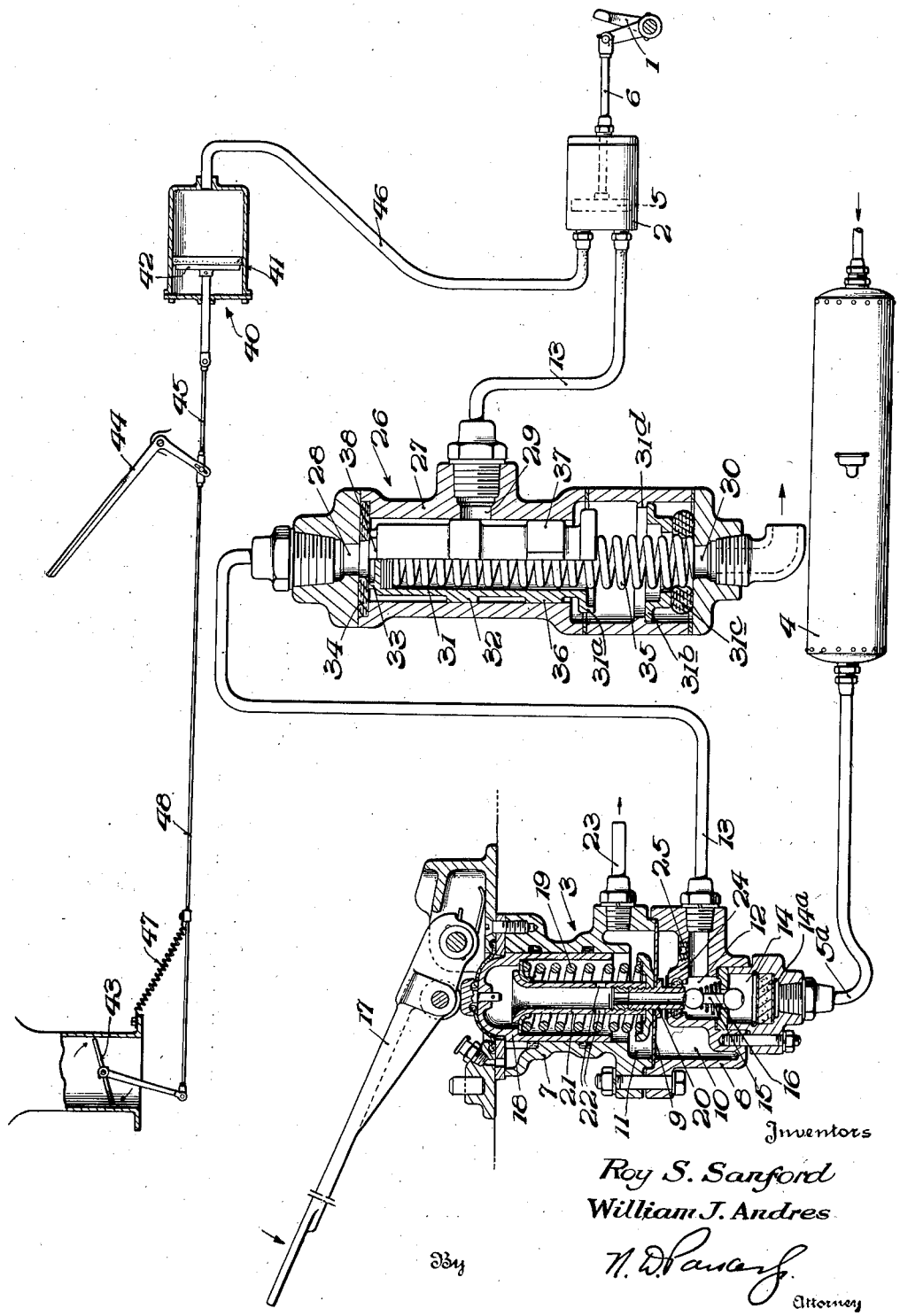
Inventors
Roy S. Sanford
William J. Andres
By
N. D. Passano
Attorney Patented Aug. 23, 1938

2,128,165

UNITED STATES PATENT OFFICE 2,128,165

VEHICLE CONTROL MECHANISM

Roy S. Sanford, New York, N. Y., and William J. Andres, Pittsburgh, Pa., assignors to Bendix-Westinghouse Automotive Air Brake Company, Pittsburgh, Pa., a corporation of Delaware Application March 11, 1936, Serial No. 68,324

13 Claims. (Cl. 192—.01)

This invention relates to vehicle-controlling mechanism, and more particularly to a device for effecting improved power operation of a motor vehicle clutch from a remotely-positioned control station.

In the operation of motor vehicles, it is not uncommon for operators to rest the left foot upon the clutch pedal while the vehicle is proceeding in gear. This practice, commonly known as "riding the clutch", results in partially neutralizing the force of the clutch-engaging spring and thereby causes slipping between the plates of the clutch which are thus unable to transmit the necessary power by reason of the decreased pressure therebetween. This habit results in rapid clutch wear and materially decreases the life of the clutch plates or linings.

With the advent of power-operated remotely-controlled vehicle clutches, the same disadvantage accrues from the practice heretofore mentioned. In some installations of remotely-controlled clutches heretofore provided, a manually-operable power-controlling valve mechanism is employed and such mechanism is so constituted as to graduate the pressure applied to the clutch motor in accordance with the extent of manual operation of the valve mechanism. It therefore follows that a slight pressure upon such manually-operable member will admit power fluid to the clutch motor to a proportionate extent and serve to partially disengage the clutch, the result being that the plates are subjected to excessive wear as outlined above.

One of the objects of the present invention is to provide a manually-controlled power-operated clutch mechanism which shall be so constituted as to avoid the disadvantages above referred to.

Another object is to provide, in a clutch-controlling mechanism of the above type, a construction whereby power fluid for effecting clutch disengagement is not transmitted to the clutch motor until the manually-operable valve mechanism has been operated an appreciable amount.

Still another object is to provide, in a construction of the character referred to above, a novel arrangement whereby partial disengagement of the vehicle clutch is prevented notwithstanding partial operation of the manually-operable controlling valve.

Still another object is to so arrange the clutch-controlling mechanism as to insure closing of the engine throttle valve upon disengagement of the vehicle clutch.

A still further object is to provide a novel and simple power-operated clutch-controlling mechanism which shall be simple in construction, reliable in operation and so constituted as to eliminate all unnecessary wear on the vehicle clutch notwithstanding that an operator might impose slight pressures upon the clutch-controlling valve during operation of the vehicle in gear.

Other object and novel features of the invention will appear more fully hereinafter from the following detailed description when taken in connection with the accompanying drawing. It is to be expressly understood, however, that the drawing is utilized for purposes of illustration only and is not designed as a definition of the limits of the invention, reference being had for that purpose to the claims appended hereto.

Referring now to the drawing, the single figure of which diagrammatically represents a vehicle-controlling mechanism constructed in accordance with the principles of the present invention, there is disclosed a vehicle clutch-controlling member 1, a power actuator 2 and a manually-operable valve mechanism 3 for controlling the flow of any suitable actuating fluid, such as compressed air for example, from a reservoir 4 to the actuator.

As illustrated, the power actuator 2 is provided with a pressure-responsive element 5 operatively connected through rod 6 with the clutch-controlling member 1 and the construction is such that fluid pressure applied to the actuator 2 effects operation of the member 1 in order to disengage the vehicle clutch, not shown, in opposition to the usual return springs associated therewith.

The manually-operable valve mechanism 3 is effective to graduate the pressure of the fluid from the reservoir 4 and may be constructed in any suitable manner. Preferably, however, the same is constituted as disclosed in the application of William J. Andres and Roy S. Sanford, Serial No. 57,411, filed January 3, 1936. As shown, such valve mechanism comprises upper and lower casing sections 7 and 8 having a diaphragm 9 clamped therebetween, the said diaphragm dividing the valve casing into a diaphragm chamber 10 and an exhaust chamber 11. The lower casing section 8 is provided with an outlet chamber 12 having a conduit connection 13 with the actuator 2. The said lower casing section is also provided with an intake chamber 14 communicating with the reservoir 4 through a conduit connection 5a, a suitable filter 14a being provided in a chamber for filtering the fluid from the reservoir.

In order to control the flow of fluid pressure from the intake chamber 14 to the outlet chamber 12 and from the latter to the exhaust chamber 11, a combined inlet and exhaust valve assembly 15 is provided which is normally urged to the position shown as by means of a spring 16. In this position, flow of fluid pressure from the reservoir 4 to conduit 13 is prevented by the valve. The latter is manually operated by any suitable pedal arrangement 17 which is adapted to move a cup-shaped member 18 slidably received in the upper casing member 7. A graduating spring 19 is interposed between the diaphragm 9 and the member 18 and upon downward movement of the latter is adapted to be compressed in order to transmit the motion of the manually-operable pedal 17 to the diaphragm 9. The latter carries a hollow valve-actuating tubular member 20 which is adapted to contact and move the valve assembly 15 to open position whenever the pedal 17 is depressed. As shown, the member 20 is secured to the diaphragm and to a hollow member 21, the latter being flared outwardly at its upper end in order to impart a predetermined degree of pre-compression to the graduating spring 19 during initial assembly of these parts. Said member 21 is provided with exhaust ports 22 which serve to maintain the hollow member 20 in constant communication with the atmosphere through exhaust chamber 11 and atmospheric connection 23.

When the valve mechanism is in its normal position, the diaphragm 9 maintains the member 20 slightly spaced from the exhaust valve portion of valve 15, thus connecting conduit 13 with the atmospheric passage 23 through member 20, ports 22 and exhaust chamber 11. However, upon depression of pedal 17, the graduating spring 19 will impart movement to the diaphragm 9 in order to effect contact between the member 20 and the valve 15. Communication between conduit 13 and the atmosphere will thus be interrupted and continued movement of the pedal 17 will open the intake valve portion of valve 15, thus admitting fluid pressure from the reservoir 4 to conduit 13. The outlet chamber 12 is separated from the diaphragm chamber 10 by a portion 24 of the lower casing section and communication between these two chambers is only permitted by means of a restricted choke 25. In this manner, after fluid pressure has been admitted past valve 15 to the conduit 13, pressure is slowly built up in diaphragm chamber 10 through the choke 25. As soon as this pressure plus the pressure of spring 16 is equal to the applied pressure of the pedal 17, the diaphragm 9 and parts connected therewith are moved upwardly in order to effect closure of the intake valve portion of valve 15. In this manner, the valve 15 is automatically moved to lapped position.

One of the features of the present invention resides in the provision of means for delaying the application of fluid pressure from the conduit 13 to the actuator 2 until the pressure in such conduit is almost sufficient to effect complete clutch-disengaging movement of the said actuator. As shown, such means comprises a snap-acting valve mechanism 26 interposed in the conduit connection 13. Said valve mechanism 26 in the form illustrated includes a hollow housing 27 provided with inlet, outlet and exhaust ports 28, 29 and 30 respectively. Within the housing, a hollow piston valve element 31 is slidably mounted, the same being provided with a centrally-positioned valve section 32 and a reduced skirt 33, the element being maintained in the position shown, that is with the skirt 33 in contact with a washer 34 as by means of a spring 35. Also formed on the valve element 31 is a guide portion 36 which is provided with flats 37 enabling communication between the outlet port 29 and the atmospheric port 30 when the valve is in the position shown in the drawing. It will be readily understood from the above described construction that when the valve element 31 is moved downwardly in response to fluid pressure in the inlet 38, the section 32 will move downwardly past the outlet port 29, thus interrupting communication between ports 29 and 30 and establishing communication between the ports 29 and 28. In this manner, the valve element 31 readily controls the flow of fluid pressure to and from the actuator 2, thus controlling the operation of the vehicle clutch.

In order to provide for the snap-acting function above referred to, it will be noticed that when the valve element 31 is in the normal inoperative position, the area 38 of the head of element 31 defined by the skirt 33 and subject to the fluid pressure in port 28 is of a materially lesser cross-section than the entire cross-sectional area of the element 31 including portion 32. The tension of the spring 35 is initially so adjusted as to maintain the valve element 31 in the position shown until the pressure built up in the inlet port 28 has reached a value almost sufficient to effect complete clutch-disengaging movement of the actuator 2. As soon as the pressure in the inlet 28 has risen to this value, the valve element 31 moves downwardly against the tension of spring 35. However, as the skirt 33 moves away from washer 34, a materially greater cross-sectional area of the valve element 31 is subjected to the fluid pressure in the inlet 28. In view of the greater cross-sectional area subjected to the pressure, it will be readily understood that the valve element 31 moves rapidly downwardly in order to completely close off communication between the outlet port 29 and the exhaust and to connect said outlet port to the inlet port. Thus, when the pedal 17 has been operated sufficiently to build up such a predetermined pressure in the inlet port 28 of the valve mechanism 26, as above outlined the latter will operate to promptly connect the valve mechanism 3 with the actuator 2 and further movement of the pedal 17 will serve to increase the pressure on the fluid to a value sufficient to effect complete disengagement of the vehicle clutch. Thus, operation of the actuator 2 will be prevented until sufficient pressure has been admitted by the valve mechanism 3 to insure complete operation of the actuator. Partial operation of the actuator 2 and consequent partial disengagement of the vehicle clutch over the range of pressures usually admitted by the valve 3 due to riding the pedal 17 is thereby eliminated. It will be understood that the tension of the spring 31 may be adjusted in such a manner as to obtain any desirable opening pressure for the valve 26.

In order to prevent loss of fluid pressure by valve portion 32, when valve 26 is opened, as above described, element 31 is formed at its lower end with a head 31a which is adapted to engage and seal against a seat member 31b. The latter is preferably resiliently supported by a rubber ring 31c which maintains the seat in engagement with a flange 31d formed on a portion of the housing 27. It will be readily understood from this construction that when the valve is moved to open position, fluid pressure passing by valve portion 32 will act upon the head 31a, which is of larger cross-sectional area than portion 32, thus firmly maintaining said head in sealing engagement with seat member 31b and preventing loss of fluid pressure through port 30.

During operation of the above parts when valve 3 is permitted to return to normal position, it will be appreciated that fluid pressure will be gradually exhausted from the actuator 2 through ports 29, 28 and valve 3. Such gradual exhaust of fluid pressure and consequent gradual engagement of the vehicle clutch will continue up to the point of complete clutch engagement before any movement of valve 26 occurs, this being due to the fact that fluid pressure acting upon surfaces 38, 36 and 31a maintains the valve 26 open until the fluid pressure acting upon said surfaces is reduced to a value substantially equal to the initial preloading of spring 35. The valve 26 will thereupon immediately close, the closing operation being snap-acting as in the case of the opening operation. The remainder of the fluid pressure in the actuator exhausts through port 30, after closure of the valve 26.

It is highly desirable in installations of this character to insure closing of the carburetor throttle valve when the clutch is disengaged in order to prevent racing of the vehicle motor. To this end, a power actuator 40 is provided which comprises a cylinder 41 having a piston 42 therein, the latter being operatively connected to the carburetor throttle valve 43 and to the accelerator pedal 44 as by means of link 45. The cylinder 41 communicates with the actuator 2 through conduit 46. A return spring 47 is connected to the throttle rod 48 and to a stationary portion of the carburetor in order to return the throttle to normal position, as well understood by those skilled in the art.

With the above mentioned arrangement, it will be readily observed that in the event the throttle valve 43 is in open position as by means of manual actuation of the accelerator pedal 44, fluid pressure supplied to the actuator 2 to effect clutch disengagement will also be supplied to the actuator 40 through conduit 46. Thus, the operator, due to the application of fluid pressure to the piston 42, will experience a force through the accelerator pedal 44 tending to return the same to normal position and will promptly remove his foot from such pedal. The actuator 4 is preferably so constructed that the accelerator pedal 44 may be moved to open the throttle regardless of the pressure supplied to said actuator. However, when fluid pressure is supplied to the clutch actuator 2, the operator will experience a reaction to operation of the accelerator pedal and will subconsciously remove any actuating force therefrom.

While only one embodiment of the invention has been illustrated and described herein, it is to be understood that the invention is not limited thereto but may be embodied in other forms as well understood by those skilled in the art. Reference will therefore be had to the appended claims for a definition of the limits of the invention.

What is claimed is:

1. In a clutch control mechanism for a vehicle clutch-controlling member, a fluid motor operatively connected with said member, a reservoir of fluid pressure, a manually-operable valve mechanism for graduating the flow of fluid from said reservoir, a conduit connecting said motor and valve mechanism, and valve means associated with said conduit for controlling the flow of fluid to said motor, said valve means moving from closed to full open position only when the pressure of the fluid reaches a value almost sufficient to effect complete clutch-disengaging movement of said motor.

2. In a clutch control mechanism for a vehicle clutch-controlling member, a fluid motor operatively connected with said member, a reservoir of fluid pressure, a manually-operable valve mechanism for graduating the flow of fluid from said reservoir, a conduit connecting said motor and valve mechanism, and valve means associated with said conduit and being normally closed for interrupting the communication between the motor and valve mechanism, said means being movable to open position to abruptly establish said communication only when a predetermined pressure is admitted by the valve mechanism.

3. In a clutch control mechanism for a vehicle clutch-controlling member, a fluid motor operatively connected with said member, a reservoir of fluid pressure, a manually-operable valve mechanism for graduating the flow of fluid from said reservoir, a conduit connecting said motor and valve mechanism, and a snap-acting valve means normally obstructing the flow of fluid through said conduit but movable from closed to full open position at a predetermined pressure to connect the valve mechanism and motor.

4. In a clutch control mechanism for a vehicle clutch-controlling member, a fluid motor operatively connected with said member, a reservoir of fluid pressure, a manually-operable valve mechanism for graduating the flow of fluid from said reservoir, a conduit connecting said motor and valve mechanism, and valve means associated with said conduit and being normally in closed position to interrupt communication between the motor and valve mechanism, said valve means being so constructed and arranged as to abruptly move from closed position to full open position when a predetermined pressure is admitted by the valve mechanism whereby communication between the latter and the motor is completely established and said predetermined pressure is conducted to the motor.

5. In a clutch control mechanism for a vehicle clutch-controlling element, a power device operatively connected with said element for moving the latter to clutch-disengaged position, and means for controlling the flow of motive energy to said device comprising a manually-operable controlling member and an automatically-operable controlling member arranged in series, said last named member being so constructed and arranged as to normally prevent application of motive energy to said motor, said last named member being movable to open position to supply motive energy to said motor only when a predetermined degree of energy has been admitted to said last named member by said first named member.

6. In combination with a vehicle clutch-controlling member, a fluid pressure actuator operatively connected therewith, a manually-operable valve for graduating the pressure of the fluid medium supplied to said actuator, a valve mechanism interposed between said valve and actuator including a pressure-responsive element movable to connect the valve and actuator, and means for resiliently biasing said element to closed position to prevent movement thereof until a predetermined pressure is reached, said element being subjected to the pressure of the fluid delivered through said valve and moving to full open position when said predetermined pressure is reached.

7. Apparatus of the class described comprising a vehicle-controlling member, a fluid motor having a pressure-responsive element connected with said member, a reservoir of fluid pressure, conduit means connecting said reservoir and motor, a manually-operable valve mechanism for graduating the pressure of the fluid flow through said conduit means, and a valve means associated with said conduit means between the motor and valve mechanism for controlling the flow of fluid pressure from the latter to said motor, said means comprising a casing having ports connected with said valve mechanism and motor respectively, a valve element slidable in said casing and normally preventing communication between said ports, said element being subjected to the pressure of the fluid from said valve mechanism, and being provided with resilient means to maintain the element in said normal position until the fluid pressure from said valve mechanism reaches a predetermined value, said element when moved from normal position presenting a larger area to the pressure of the fluid from the valve mechanism whereby the valve element is promptly moved to full open position to connect said ports without further increase of fluid pressure from said mechanism.

8. In a control mechanism for a vehicle controlling member, a fluid motor operatively connected with said member, a source of fluid pressure, a manually-operable valve mechanism for graduating the flow of fluid from said source, and means including a valve device for connecting said motor and mechanism, said device being constructed and arranged to establish communication between the valve mechanism and motor at a predetermined pressure and to interrupt communication at a different predetermined pressure.

9. In a control mechanism for a vehicle controlling member, a fluid motor operatively connected with said member, a source of fluid pressure, a manually-operable valve mechanism for graduating the flow of fluid from said source, and means including a valve device for connecting said motor and mechanism, said device embodying a snap-acting valve element operable to establish communication between the valve mechanism and motor at a predetermined pressure and to interrupt said communication at a different predetermined pressure.

10. In a control mechanism for a vehicle controlling member, a fluid motor operatively connected with said member, a source of fluid pressure, a manually-operable valve mechanism for graduating the flow of fluid from said source, and means including a valve device for connecting said motor and mechanism, said device embodying a snap-acting valve element operable to establish communication between the valve mechanism and motor only when a predetermined pressure has been admitted by the mechanism and to maintain said communication throughout a substantial range of pressure reduction.

11. In a control mechanism for a vehicle controlling member, a fluid motor operatively connected with said member, a source of fluid pressure, a manually-operable valve mechanism for graduating the flow of fluid from said source, and means including a valve device for connecting said motor and mechanism, said device establishing communication between said mechanism and motor only when a predetermined pressure has been admitted by the mechanism and maintaining said communication throughout a substantial range of pressures during release of pressure by said valve mechanism.

12. In a control mechanism for a vehicle controlling member, a fluid motor operatively connected with said member, a source of fluid pressure, valve mechanism for graduating the flow of fluid from said source, and means including a valve device for connecting said motor and mechanism, said device being constructed and arranged to establish communication between the valve mechanism and motor at a predetermined pressure and to interrupt communication at a different predetermined pressure.

13. In a motor vehicle having a clutch controlling member and a throttle valve, a fluid pressure motor operatively connected to said member, means including a valve for controlling the admission and exhaust of fluid pressure to and from said motor for effecting clutch disengaging and engaging movements of said member, a fluid pressure actuator having a movable element operatively connected with the throttle valve, and means including a conduit connecting said motor and actuator for conducting fluid pressure from the motor to the actuator.

ROY S. SANFORD.
WILLIAM J. ANDRES.